United States Patent Office.

WILLIAM P. VALENTINE, OF BUFFALO, NEW YORK.

Letters Patent No. 76,276, dated March 31, 1868.

IMPROVED ROOFING-COMPOUND.

The Schedule referred to in these Letters Patent and making part of the same.

TO ALL WHOM IT MAY CONCERN:

Be it known that I, WILLIAM P. VALENTINE, of Buffalo, in the county of Erie, and State of New York, have invented certain new and useful Improvements in Cement-Roofs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists of making a fire and water-proof roof of a new compound, prepared and applied as hereinafter explained.

I first prepare the roof for the reception of the composition, by covering it with boards, nailed on tightly and close together, as a foundation. I then prepare the composition, by taking, of a species of clay composed of about equal parts of alumina and silica, a quantity equal to about three-fifths of the whole. With this I then mix thoroughly a quantity of hydraulic cement, equal to two-fifths. I then saturate this mixture with raw coal-tar, adding only enough of the tar to form a stiff compound or dough, and immediately spread a thin coat of it upon the roof, and compact or press it down with a heavy iron roller. In this state I leave it for some time, during which the heat absorbed will cause the roof-boards to shrink to their utmost capacity. After the boards have thus become thoroughly shrunk and the coating well hardened, I then cover with a second coat of the composition, thoroughly pressed and compacted by the roller, as before. In this condition it will, of course, be black, in consequence of the coal-tar, and I then sprinkle over it a coating of sand, cement, ochre, or any other similar substance, to impart to it any desired color, the material thus applied being made to adhere by pressing it with the roller.

In this way I construct a roof, without the use of felt, canvas, or any similar material, and that becomes in a short time almost as hard as a stone, and that is thoroughly fire and water-proof.

The composition should be used as fast as prepared, as the cement gives it a tendency to set or harden in a short time.

Having thus described my invention, what I claim, is—

A roof, composed of the materials combined and applied in the manner herein described.

W. P. VALENTINE.

Witnesses:
   W. C. DODGE,
   H. B. MUNN.